United States Patent [19]

Gfeller

[11] 4,422,088

[45] Dec. 20, 1983

[54] BUS ARRANGEMENT FOR INTERCONNECTING CIRCUIT CHIPS

[75] Inventor: Fritz R. Gfeller, Adliswil, Switzerland

[73] Assignee: International Business Machines Corporation, Armonk, N.Y.

[21] Appl. No.: 328,306

[22] Filed: Dec. 7, 1981

[30] Foreign Application Priority Data

Apr. 28, 1981 [EP] European Pat. Off. ........ 81103161.3

[51] Int. Cl.³ .................. H01L 31/12; G02B 5/14
[52] U.S. Cl. ............................. 357/19; 350/96.13; 350/96.16
[58] Field of Search ............ 357/19; 350/96.13, 96.12, 350/96.14, 96.15, 96.16, 96.17, 96.18

[56] References Cited

FOREIGN PATENT DOCUMENTS 2364935 10/1976 France .......................... 350/90.14

OTHER PUBLICATIONS

Becker et al., "Electrooptical Switching in Thin Film Waveguides for a Computer Communication Bus", *Applied Optics*, vol. 18, No. 19, Oct. 1979, pp. 3296–3299.

"Introduction to Integrated Optics", Barnoski ed., Plenum Press, p. 371 (1974).

Chen et al., "Bragg Switch for Optical Channel Waveguides", *Appl. Phys. Lett.*, vol. 33, No. 1, pp. 33–35, Jul. 1978.

Hsu et al., "Flip Chip Approach to End Fire Coupling Between Single Mode Optical Fibers & Channel Waveguides", *Electronic Lett.*, vol. 12, No. 16, pp. 404–405, Aug. 1976.

*Primary Examiner*—Martin H. Edlow
*Assistant Examiner*—J. L. Badgett
*Attorney, Agent, or Firm*—Francis J. Thornton

[57] ABSTRACT

An optical bus arrangement is disclosed for interconnecting a plurality of circuit modules (15, 17 ... ). It comprises a plurality of optical busses (25) each including a feeder waveguide (41) and a signal waveguide (43). Junctions (45) for controllably switching light from feeder to signal waveguide, and leaky regions (47) for detecting the status of the signal waveguide, are provided at regular intervals. Arrays of lasers/LEDs (33) at both ends constantly furnish light to the feeder waveguides.

Each module has a plurality of input ports (27) each comprising a photodetector for detecting light from one leaky region, and a plurality of output ports (45) each comprising an electrode grating for controlling switching of light in one junction. Input ports and output ports are integrated portions of the chips. Thus, the optical waveguide switches disclosed have the specific feature of being partially incorporated as waveguide junction in a substrate (23), and partially as control electrodes integrated on a chip.

6 Claims, 7 Drawing Figures

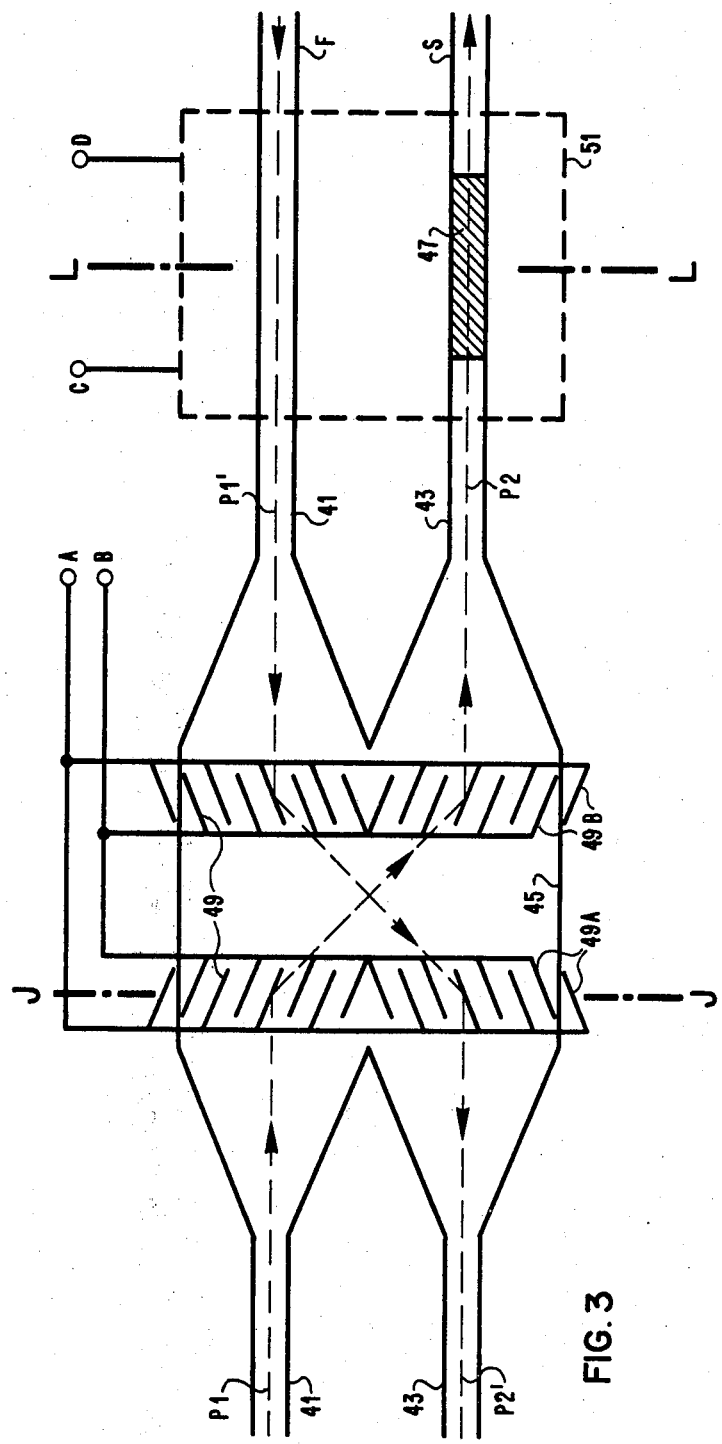
FIG. 3
FIG. 5 CROSS-SECTION L-L
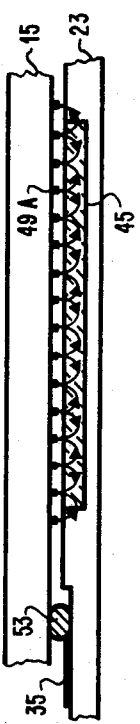
FIG. 4 CROSS-SECTION J-J

BUS ARRANGEMENT FOR INTERCONNECTING CIRCUIT CHIPS

BACKGROUND OF INVENTION

1. Field of Invention

The present invention is concerned with a bus arrangement for interconnecting circuit chips each having at least one input port and one output port, using optical waveguides, and with an optical waveguide switch for cooperation with electronic circuit chips.

2. Description of Prior Art

Semiconductor integrated circuits have experienced a significant growth in the density of components and in the complexity of functions per chip. The trend towards very large scale integration (VLSI) continues and the cost per function decreases due to the batch processing of wafers. However, with increasing complexity the pin-out per chip also increases. This causes an increase in cost and a degradation of performance on two levels:

On the chip-packaging level, the chips are handled individually. With increased pin-out the handling cost for bonding wires to chip pads, and packaging cost increase.

On the module level, several chips have to be interconnected on a printed-circuit board to perform the function of a complete system, e.g. a microprocessor system. With increase pin-out per chip, the size of the package and the number of interconnecting lines are also increased. This has several undesirable effects:

The layout of the circuit board becomes more complex, hence increasing design time and cost. The average distance between pins becomes longer causing an increased delay in signal propagation. Also, the stray capacitance and noise pick-up of the signal lines becomes worse.

It is therefore desirable to have a signal transfer arrangement for interconnecting circuit chips on a board which is not subject to above disadvantages of electrical distortion by noise and stray fields, and which needs no contact bonding but which allows high packing densities and is suitable for large quantity production. Utilization of optical transmission technology for this purpose would be particularly desirable.

In an article by L. Balliet et al "Module-to-module Communication Via Fiber-Optic Piping", published in the IBM Technical Disclosure Bulletin, Vol. 22, No. 8B, January 1980, pp. 3519-3520 it was suggested to use fiber-optic paths or waveguides in circuit cards to interconnect modules. The article shows only a single connection and does not disclose how high packing densities and multidrop (bus) connections for interconnecting a plurality of modules can be achieved. Furthermore, it is necessary to integrate light sources (LED or laser) into the modules which is disadvantageous, particularly if many interconnections, i.e. many sources are required.

Optical switches for selectively switching light between optical fibers or waveguides are known, e.g. from following patents and publications: (a) U.S. Pat. No. 3,208,342 (A. H. Nethercot) "Electro-optic Light Coupling of Optical Fibers"; (b) E. G. Lean: "Optical Switch and Modulator in Parallel Waveguides", IBM Technical Disclosure Bulletin, Vol. 17, No. 4, September 1974, pp. 1210-1213; (c) R. V. Schmidt: "Guided Wave Optical Devices Using Ti-diffused LiNbO$_3$", Proceed. Electro-optic System Design Conference, New York, 1976, pp. 557-560; (d) H. P. Hsu et al: "Flip-chip Approach to Endfire Coupling Between Single-mode Optical Fibers and Channel Waveguides", Electronics Letters, Vol. 12, No. 16, Aug. 5, 1976, pp. 404-405; (e) U.S. Pat. No. 4,035,058 (M. Papuchon) "Electro-optical Switch and a Method of Manufacturing Same"; (f) O. Mikami et al: "Directional Coupler Type Light Modulator Using LiNbO$_3$ Waveguides", Technical Digest 100C 1977, pp. 161-164; (g) M. Papuchon: "Electrically Active Optical Bifurcation", Technical Digest 100C 1977, pp. 165-168; (h) B. Chen et al: "Thin Film Optical Switch", Technical Digest 100C 1977, pp. 173.

All these papers and patents describe how light can be controllably coupled from one optical fiber or waveguide into another. None of them suggests, however, how a great number of closely spaced interconnections can be made between a plurality of circuit chips on a module.

Coupling between optical fibers or waveguides without switching control is known, e.g. from U.S. Pat. No. 3,994,559 (J. D. Crow et al) "Bidirectional Guided Mode Optical Film-fiber Coupler", and from the publication of E. A. Ash: "Leaky Wave Couplers for Guided Elastic Wave and Guided Optical Wave Devices", IBM Technical Disclosure Bulletin, Vol. 15, No. 1, June 1972, pp. 309-310. Both do not show how many closely packet interconnections can be made between chips or modules each having a great number of input and output ports.

SUMMARY OF THE INVENTION

For interconnecting a plurality of integrated circuit chips, optical waveguide buses are provided in a substrate. Each optical bus consists of a feeder guide and a parallel signal guide which merge at regular intervals to form junctions. Also provided at regular intervals are leaky regions of the signal guide allowing one to detect the state of the signal guide.

Each junction may be either inactive, confining the light to the feeder guide, or active to transfer light from the feeder to the signal guide. If all junctions of a bus are inactive, the signal guide is dark (state "0"). If at least one junction of a bus is active, the whole signal guide is flooded with light (state "1") which can be detected at any of the leaky regions.

Each chip has several input and output ports instead of conducting pins. Each output port comprises a Chevron grating and each input port comprises a photodiode. Chips are so placed on the substrate that each grating coincides with a junction and each photodiode coincides with a leaky region.

The grating, when excited, generates a spatially periodic electric field penetrating into the substrate, thus causing a transfer of light from the feeder to the signal waveguide.

It is an object of the present invention to devise a circuit chip interconnection arrangement that allows close packaging and is suitable for large scale production.

Another object of the invention are means for interchip signal transfer which are not responsive to electrical noise signals and switching transients, but can be closely packed with the electronic circuit chips.

It is a further object of the invention to provide an optical chip interconnection system that needs no optically active or light-generating means in the circuit chips.

Another object of the invention is an interconnection system in which only integrated elements are required on circuit chips and on a substrate carrying the chips, without requirement of establishing individual connections between chip I/O ports and a bus system.

A further object is an optical waveguide switch which is well suited for packaging and cooperation with electronic circuit chips.

These objects are achieved by a bus arrangement for interconnecting circuit chips and by an optical waveguide switch as defined in the claims.

Besides having the desirable characteristics stated in above objects, the invented arrangement has the following advantages: It enables a cost reduction for packaging circuit chips in modules. It further allows faster operation due to very short propagation delays which are possible because interconnections are direct and thus short, and because signals do propagate at the speed of light.

BRIEF DESCRIPTION OF THE DRAWINGS

FIG. 3 is a more detailed view of a single couple of input port and output port associated with a single optical bus line;

FIG. 4 is a cross-sectional view of the output port of FIG. 3 taken along the lines J—J;

FIG. 5 is a cross-sectional view of the input port of 3 taken along the lines L—L;

DETAILED DESCRIPTION OF THE INVENTION

Figure 1:
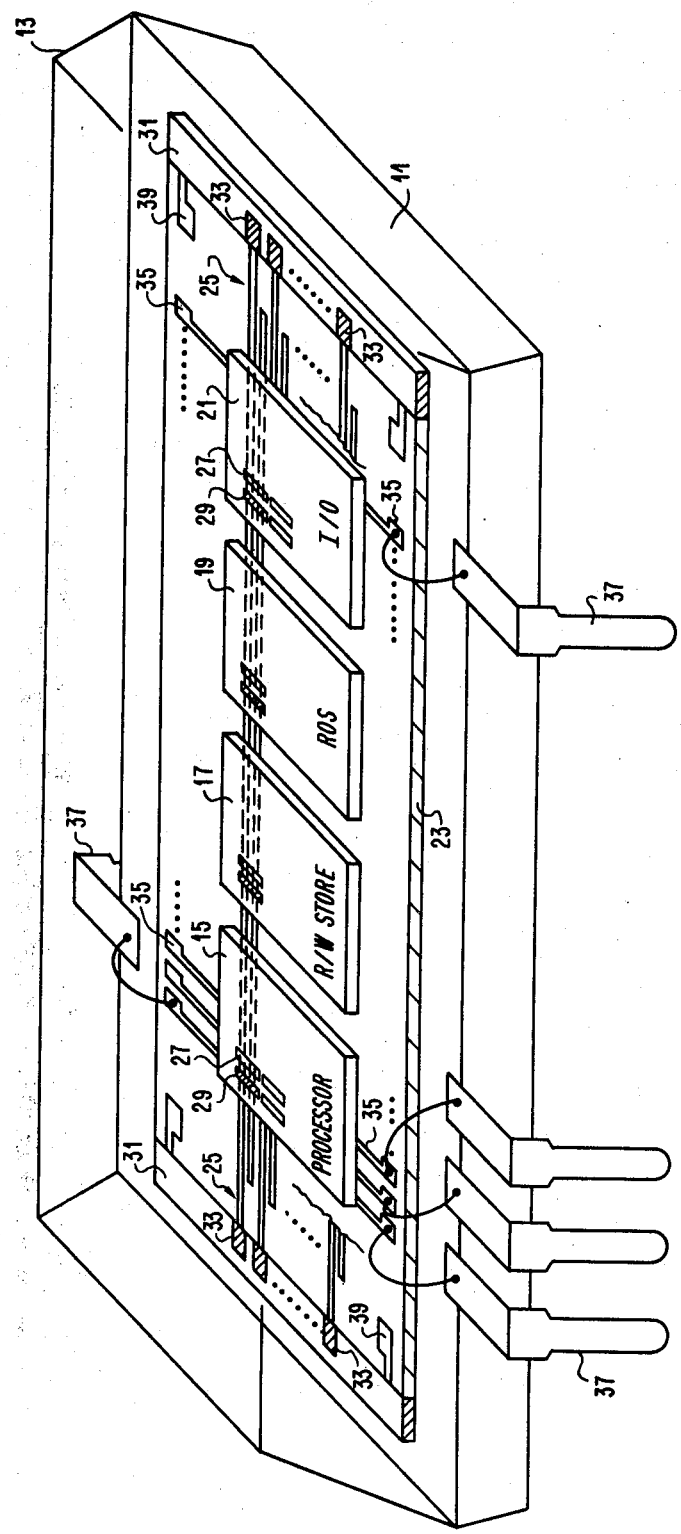
FIG. 1 is a perspective view of a module board carrying a plurality of circuit chips interconnected by an arrangement of optical bus lines according to the invention.

FIG. 1 is a perspective view of a system in which the present invention is embodied. The system is a microcomputer in a single package or module comprising a base 11 and a cover 13 into which the system is sealed. The microcomputer consists of several integrated circuit chips 15, 17, 19, 21 which are mounted on a common substrate 23. The chips may be functional units such as a processor, a read/write store, a read-only store and I/O circuitry as shown in the drawing.

Internal connections between the chips are effected by an arrangement of parallel optical busses 25 which are integrated into substrate 23. Signal transfer between optical busses and chips is effected by input ports 27 and output ports 29. These ports as well as the structure of the bus arrangement will be explained in more detail in a later section.

Extensions 31 of substrate 23 carry arrays of integrated light emitting diodes (LED) or laser diodes 33 for generating light by which a subset of the optical bus waveguides can be illuminated.

For external connections between the chips and the environment, pads 35 of conducting material are integrated into substrate 23. Contacts between chips and pads may be made, e.g. by balls of conducting material in a well known manner, and thus, are not shown in the drawing. Pads 35 can be individually connected to external connector pins 37 which are mounted on base 11 of the microcomputer package or module. Through these pins, data I/O signals and external control signals are transferred, and they serve also for supplying power to integrated circuit chips 15, 17, 19, 21. Additional conductor pads 39 which can also be connected to an external pin (not shown) are provided for supplying power to the arrays of LED's or lasers 33 in substrate extensions 31.

Though a microcomputer system is shown as an example, the contactless optical bus interconnection arrangement of the invention can be used for any other system in which a plurality of electric circuit chips are to be combined in a package or module as, e.g. in communication modems or transceivers, in machine control devices, in audio systems, etc.

Principles of the structure and operation of the invented contactless chip interconnection system will now be explained in connection with FIG. 2 which shows only a portion of the module of FIG. 1 including mainly one chip 15 and one LED/laser array 31. The illustration of FIG. 2 is schematic and not in correct scale, i.e. portions essential to present description are shown larger in relation to chip size than in reality.

Figure 2:
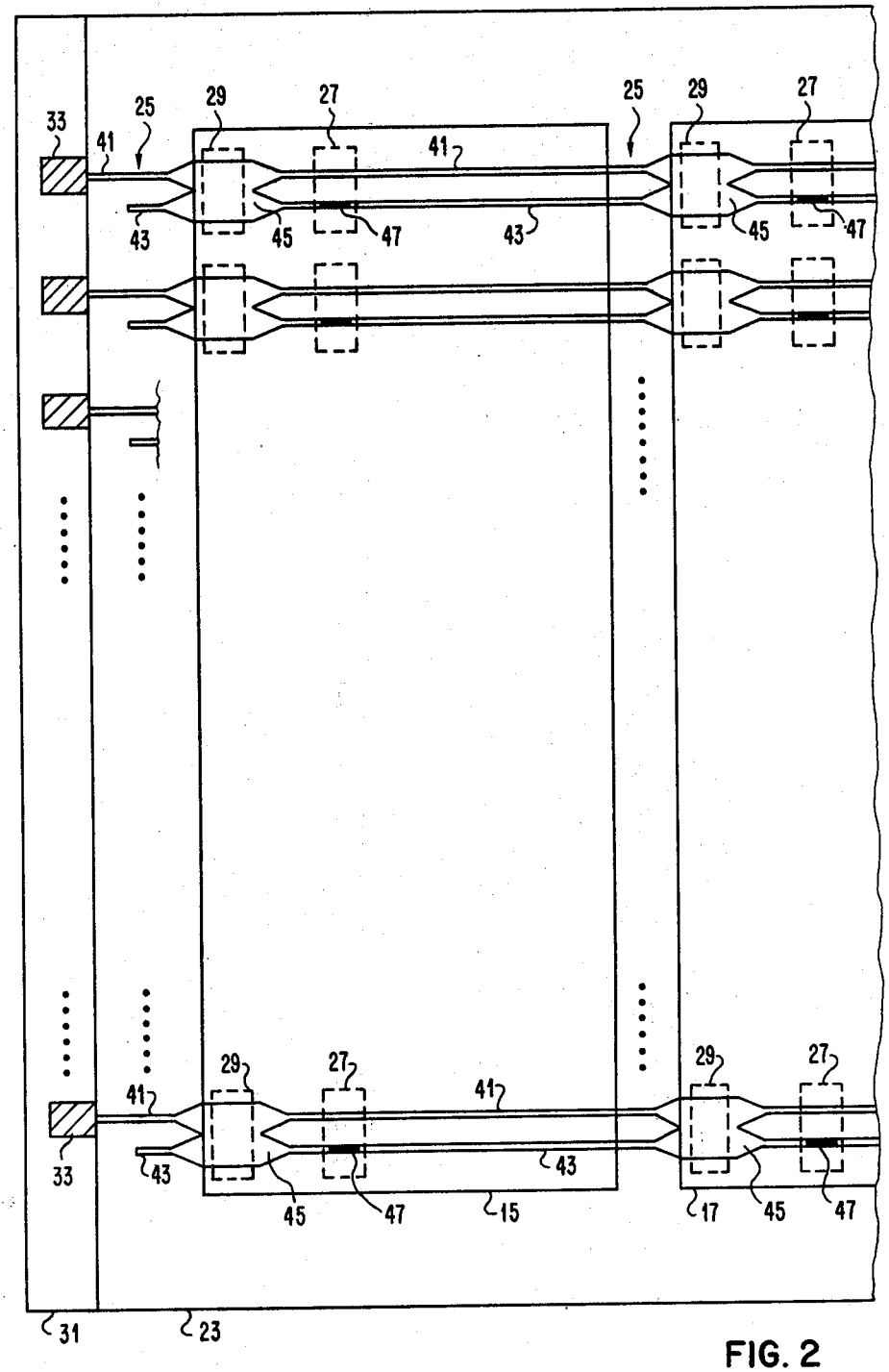
FIG. 2 is a schematic representation of a single chip and associated portions of the optical bus lines, including input/output ports for interconnecting chip and bus lines.

The optical bus arrangement for interconnecting the chips consists of a plurality of pairs of parallel bus lines 25 of which only a few are shown in FIG. 2. The optical bus lines are embedded in the surface of an optically transparent substrate 23. They are defined by regions of higher refractive index than the surrounding material, thus forming optical waveguides as is well known in integrated optics. Furthermore, these waveguides consist of a material having electro-optic properties such as $LiNbO_3$. Such waveguides and their generation are described in the literature, e.g. in the publications cited in the introduction of this specification.

Each of the plural optical bus lines consists of two waveguides, namely, a feeder guide 41, and a signal guide 43. At regular intervals the two guides merge, thus forming a junction 45. At both ends of each feeder guide 41, a laser diode or LED 33 is provided for feeding light into the associated waveguide. (Only one side shown in FIG. 2). The light furnished may be of constant intensity or pulsed.

In one state, i.e. logical zero, the light is confined to the feeder waveguide 41 only and there is no transfer of light across the junctions 45. In the other state i.e. logical one, one of the junctions is activated (as will be described later) and switches the light from the feeder waveguide 41 to the signal waveguide 43 in both directions. Hence, the entire length of the signal waveguide is flooded with light.

At regular intervals, there are leaky regions 47 in the signal guide where light leaks out from the waveguide, thus allowing the state of the signal guide to be detected. These leaky regions may be formed by etching or abrasion of the optically smooth surface of the signal waveguide structure in the substrate in a defined pattern.

For interchip communication through this optical bus arrangement, signals must be transferred between busses and chips. This transfer is described below in conjunction with FIGS. 3, 4, 5, 6 and 7.

Each chip has a plurality of input ports 27 each comprising a photodiode 51 coupled to a receiver-driver circuit 55, and a plurality of output ports 29 each comprising a pair of gratings 49A and 49B also coupled to the receiver-driver circuit. Each chip is placed on the substrate 23 such that each pair of the gratings coincides with a respective junction 45 between waveguides 41 and 43 and each photodiode coincides with a respective leaky region 47 of the signal guide 43. Both the gratings and the photodiodes are integrated components in the chip.

FIG. 3 shows portions of a feeder guide 41 (F) and a signal guide 43 (S) with one junction 45 and one leaky region 47. The waveguides, designed for monomode operation, have a width of about 4 μm and are separated by a gap of about 20 μm. Over a given distance of about 100 μm the waveguide material fills the gap forming junction 45. On both sides of the junction, for a length of about 50 μm, the width of the feeder and signal waveguides increases gradually until they join, as shown in the drawings. The axes of feeder and signal waveguides, however, form essentially straight lines over the whole length of the optical bus line. Each grating (49A, 49B) of the pair of gratings is a chevron pattern of inclined parallel metal strips which are alternatingly connected to points A and B of circuit 55. Spacing between adjacent metal strips is in the order of 1 μ. The angle between the metal strips and the axis of each waveguide is equal to the Bragg angle. The upper half and the lower half of each grating have inverse inclination angles so that all metal strips are directed approximately towards the center of junction 45. A pair of gratings covers an area of about 50×100 μm. This is roughly the same area as that of one conventional wiring pad. Photodiode 51 is only indicated in dashed lines in FIG. 3. It also covers an area of about 50×100 μm and is connected to points C and D of the circuit 55. In FIG. 3, different scales are used in the two coordinate directions (relation 1:2).

The use of a pair of inclined gratings for switching of light between feeder and signal waveguides has the following advantage: waveguides can be basically straight and at very close distance, because of the two-step diffraction effect of the pair of gratings at the junction. At junctions which are not activated, light in feeder waveguide as well as in signal waveguide can pass straight through, thus minimizing losses at junctions.

Cross sections J—J and L—L indicated on FIG. 3 are shown separately in FIGS. 4 and 5. In FIG. 4, substrate 23 is shown with an optical bus line junction 45 at its upper surface, and above it, chip 15 can be seen with grating 49A on its lower surface. Conductors (not shown) in chip 15 are in contact with pads 35 of the substrate through contact material 53 which is ball-shaped as is well known in chip packaging technology.

In FIG. 5, substrate 23 is shown with a feeder guide (F) 41 and a signal guide (S) 43 having a leaky region 47 at its upper surface. Integrated circuit chip 15 above it has an integrated photodiode 51 at its lower surface. Chips and substrate may be bonded together with an optically transparent glue (not shown) to obtain efficient cooperation and signal transfer between the input-/output ports and the optical bus line arrangement. The distance, i.e. the gap between chips and substrate, should be constant and as small as possible.

Operation of the ports and optical bus system is as follows:

For activating an output port 29, a voltage of, e.g. 5 volts is applied to the respective pair of gratings 49A and 49B each of which in turn induces a periodic electric field within a shallow depth of the substrate (cf. FIG. 4) indicated by the curved arrows from a metal strip of the waveguides into the material of the waveguide back to an adjacent metal strip. Due to the electro-optic properties of the waveguides and their junction 45, a periodic index variation is also induced which affects the light propagating in the feeder waveguide (P1 and P1' in FIG. 3). As indicated above, the angle between the grating strips and the waveguide axis corresponds to the Bragg angle which causes efficient deflection of the light from P1 and P1' in the feeder waveguide 41 through junction 49 to P2 and P2' respectively in the signal waveguide 43. The upper half of each grating causes deflection of light from feeder waveguide 41 towards the center of junction 49, while the lower half of each grating causes further deflection of light coming from the center of junction 49 into signal waveguide 43.

The state of the signal waveguide is sensed by the photodiodes 51 placed over the leaky regions 47 (cf. FIG. 5). Hence, the active state of one output port 29 can be sensed by all input ports 27 on the same bus line. This corresponds to the operation of a conventional bidirectional three-state bus line.

Bus line densities:

Due to the small dimensions of the optical bus lines (ca. 50 μm including junctions), about 50 bus lines may be implemented under the area of a chip of ca. 6 mm length. This number is sufficiently large to form a complete bus structure including data lines, addressing lines and control lines.

Figure 6:
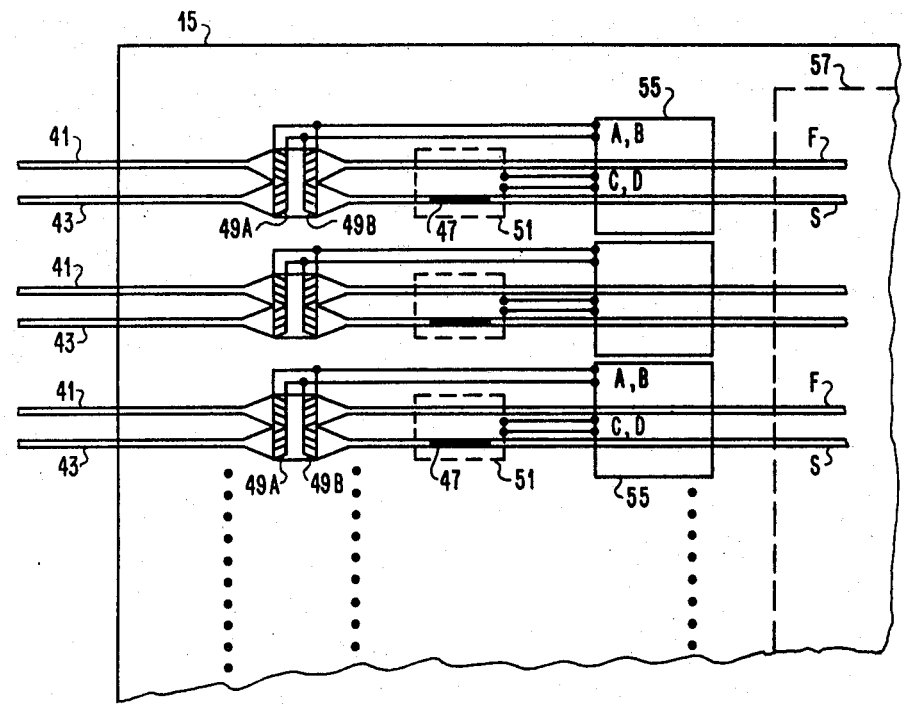
FIG. 6 is a schematic view of the arrangement of circuitry for I/O ports on a chip.
Figure 7:
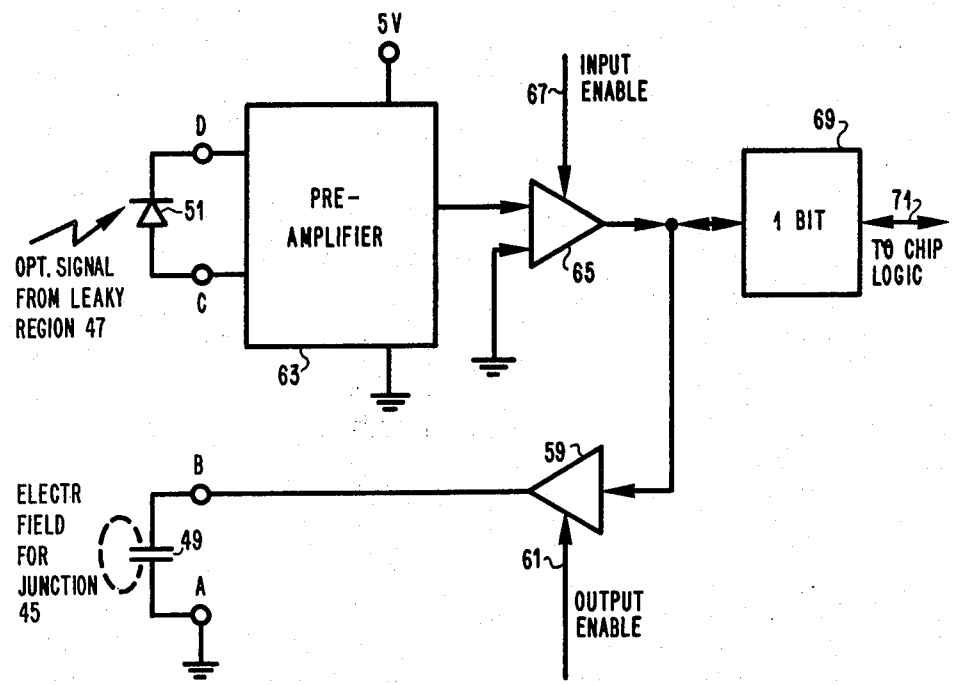
FIG. 7 is a block diagram of circuitry for a single couple of input port and output port, for integration on a circuit chip.

Driver and receiver circuits:

Arrangement of output port drivers and input port receivers on the chip and the respective electrical circuitry are shown in FIG. 6 and FIG. 7.

In FIG. 6, one corner of a chip 15 is depicted. At one edge of the chip, a column of fifty grating pairs is deposited. Next to it, a column of fifty photodiodes is integrated on the chip. Inward from each photodiode, a driver and receiver circuit 55 is integrated in the same row on the chip. Only two transversal connecting lines must be provided between circuit 55 and grating pair 49. Each driver and receiver circuit 55 is also coupled to a 1-bit input/output buffer 69. Thus, fifty grating pairs 49, fifty photodiodes 51 and fifty circuits 55 are located in three adjacent columns on chip 15. The remainder of the chip is available for the main integrated logic circuitry of the chip, and indicated by dashed line 57.

Other arrangements are of course possible. Driver and receiver circuits 55 can, e.g. be located between associated grating pair 49 and photodiode 51. It is also possible to place gratings along one edge of the chip, and photodiodes along the opposite edge of the chip. Sharing of circuitry for input port and output port would be more difficult, however, in this latter arrangement.

Each grating pair 49 has a capacity in the order of 10 pf and can be energized direct from an integrated bus driver circuit. The electrical signal received from a photodiode needs prior amplification before reaching the logical signal level. However, the amplification required is way below that required for optical fiber links, hence requiring a much less complex receiver circuit. An optical signal power of 1 mW (0dB$_m$) is considered to be propagating in the feeder waveguide in one direction. Assuming 100% optical switching efficiency and 5% optical signal loss at each leaky region, the signal radiated at the tenth leaky region, i.e. after ten tapping points (chips) from the switching junction, is still 3% of the light in the feeder waveguide, or −15.23 dB$_m$. As a comparison, a commercial fiber-optic receiver needs only about −30 dB$_m$ optical signal power at 10 M Bit/s for error-free detection.

FIG. 7 is a block diagram of one driver/receiver circuit 55 that is coupled to one pair of gratings 49 and one photodiode 51. The pair of gratings 49 is shown as a single capacitor between points A and B. It is connected to the output of integrated driver 59 which can be enabled by a control signal on line 61 from the chip's logic circuitry. Photodiode 51 is connected through points C and D to integrated preamplifier 63. The output signal of preamplifier 63 is compared to ground potential in comparator 65 which can be enabled by a control signal on line 67 from the chip's logic circuitry. Output of comparator 65 and input of driver 59 are both connected to an integrated 1-bit buffer which in turn is connected by a data line 71 to the logic circuitry of the respective chip. Thus by n data lines 71, n input enable lines 67 and n output enable lines 61 the logic circuitry of the chip can selectively sense any one of n input ports and selectively activate any one of n output ports.

Alternatives and additional features:

Instead of a single bus system as shown in the embodiment above, several bus systems of different configurations may be incorporated on the same substrate. Such separate bus systems may either be isolated from each other, or they may be interconnected by means of optical branches which can be activated, i.e. switched selectively.

Another possibility is to provide an optical bus system consisting of waveguides arranged like a grid in two coordinate directions but on the same level thus crossing at right angles. At the crosspoints, light propagating in one coordinate direction (e.g. horizontal) does not interfere with light propagating in the other coordinate direction (e.g. vertical). Thus, optical data signal transfer is independent in both coordinate directions despite physical connection of the optical bus lines at crosspoints. Such a bus arrangement will allow array processing of data in processor chips which are arranged in rows and columns, i.e. in matrix form. During processing, data will be propagated in two dimensions. Transfer from one coordinate direction to the other will be effected in the chips.

Interconnections between optical bus lines arranged in a two-dimensional grid pattern could of course also be effected by selectively actuable optical switches or branches between horizontal and vertical waveguides.

Another alternative is the provision of individually actuable lasers or LEDs 33 instead of arrays which permanently emit light. This would allow selective inhibiting or enabling individual optical bus lines of the whole bus arrangement. Thus, each feeder line would itself carry a logical input signal, and the associated signal line would carry a logical output signal depending on both, the feeder logical input signal and the logical status of output ports on the associated circuit chips.

A further possibility is to provide more than one signal waveguide with each feeder waveguide, e.g. one signal guide at each side of the feeder guide, with separate junctions between each signal guide and the feeder guide, or a second signal guide directly beside the first signal guide and connected to it by separate junctions. Respective additional input ports and output ports are of course required on the chips.

While the invention has been particularly described with respect to a preferred embodiment, it should be understood by one skilled in the art from the foregoing that changes in form or detail may be made without departing from the spirit and scope of the invention.

What is claimed is:

1. A semiconductor module for interconnecting circuit chips comprising:
   a substrate including an optical waveguide bus structure at the surface of said substrate, said structure including at least one optical waveguide bus comprising a feeder waveguide and a signal waveguide;
   a plurality of separately controllable coupling junctions between each feeder waveguide and its associated signal waveguide; said waveguide each extending longitudinally in a straight line and parallel to each other, the lateral extension of each waveguide gradually increasing symmetrically with respect to the straight axis of the respective waveguides towards the junction on both sides said waveguide propagating light only along the straight axis of each wave guide and a plurality of optical output means on each signal waveguide;
   light source means coupled to said substrate for illuminating each said feeder waveguide; and
   a plurality of circuit chips mounted on said substrate, each including control elements and photodetector elements;
   each of said control elements comprising a pair of said electrode gratings the upper half and lower half of each grating being inclined at inverse angles with respect to each other and to the axis of the associated optical waveguide bus so that when said pair of gratings is electrically excited light propagating in the respective feeder waveguide is deflected first toward the center of the associated coupling junction and then into the respective signal wave guide;
   each of said control elements being located adjacent to a respective coupling junction, and each said photodetector element being located adjacent to a respective optical output means.

2. A module in accordance with claim 1, characterized in that each said control element comprises at least one electrode grating integrated on the respective circuit chip, for generating a spatially periodic electric field in said adjacent coupling junction in said substrate for thus effecting deflection of light in said adjacent coupling junction from said feeder waveguide to said signal waveguide when a voltage is applied to said grating.

3. The module in accordance with claim 1, characterized in that each said optical output means is a leaky region including a restricted surface area on the respective signal waveguide in said substrate, having a different surface structure than the remainder of said signal waveguide.

4. The module in accordance with claim 1, characterized in that said light source means comprise an array of light emitting diodes or laser diodes at each of two opposite edges of said substrate, and that each said feeder waveguide extends towards said two edges of the substrate and faces a light source at each of its ends.

5. An optical waveguide switch comprising a junction between two waveguides consisting of an electro-optic material integrated in a substrate and control electrode means, characterized in that said control electrode means includes an electrode grating pattern for generating a spatially periodic electric field formed on an integrated portion of an electronic circuit chip on said substrate, said substrate and said chip being mounted on top of each other so that said grating pattern faces said junction, and in that the grating pattern consists of two gratings each having an upper half and lower half and each half of which comprises electrode fingers inclined with respect to the waveguide axes, the grating of each half being inclined at an angle with respect to the gratings of the other half so that light is first deflected from one waveguide towards the center of the junction by one of said gratings and then from the center of the junction towards the other waveguide by the other of said gratings.

6. A waveguide switch in accordance with claim 5, characteirzed in that the two waveguides each extend longitudinally in a straight line and are parallel to each other, that the lateral extension of each waveguide gradually increases symmetrically with respect to the straight axis of the respective waveguide towards the junction on both sides, so that without control electrode excitation, light propagates only along the straight axis of each waveguide.

* * * * *